United States Patent [19]

O'Connor

[11] 4,190,217
[45] Feb. 26, 1980

[54] FILTER SYSTEM FOR AGRICULTURAL AIRCRAFT

[75] Inventor: William M. O'Connor, Westport, Conn.

[73] Assignee: Avco Corporation, Stratford, Conn.

[21] Appl. No.: 857,218

[22] Filed: Dec. 5, 1977

[51] Int. Cl.$^2$ .............................................. B64B 1/24
[52] U.S. Cl. .................................. 244/53 B; 55/306; 55/312; 55/498; 60/39.09 P
[58] Field of Search .......................... 55/306, 312–314, 55/498; 60/39.09 R, 39.09 P; 244/53 B, 53 R

[56] References Cited

U.S. PATENT DOCUMENTS

| | | | |
|---|---|---|---|
| 3,016,109 | 1/1962 | Howard, Jr. | 55/312 |
| 3,329,377 | 7/1967 | Peterson et al. | 55/306 |
| 3,617,149 | 11/1971 | Gibson | 55/481 |

FOREIGN PATENT DOCUMENTS 124101  5/1947  Australia ................................... 55/306

*Primary Examiner*—Bernard Nozick
*Attorney, Agent, or Firm*—Ralph D. Gelling

[57] ABSTRACT

A cylindrical type automotive barrier filter is adapted to be used in the inlet airflow of a gas turbine engine that is used in an agricultural aircraft. Air is drawn in through an inlet in the upper portion of the aircraft nose body without appreciable disturbance to the aerodynamic contours. The outlet of the filter is connected to a duct in a sealed relationship to direct the airflow to the engine inlet. The airflow passage is sealed by a connecting flange mounted on the filter to which the duct is connected. A longitudinally extending firewall is constructed to separate the filter and connecting duct from the turbine section of the engine. An emergency bypass door is provided to provide an inlet airflow in the event the filters become clogged. The bypass door is designed to provide particle separation of the incoming air.

1 Claim, 4 Drawing Figures

FILTER SYSTEM FOR AGRICULTURAL AIRCRAFT

BACKGROUND OF THE INVENTION

Agricultural aircraft are generally used in areas which are inaccessible to ready supplies of spare parts. This necessitates that the operator of the aircraft maintain an inventory of the critical spare parts which he may need in the field. In the past the filter systems for a gas turbine engine utilized inertial separators which are both complicated and expensive and necessarily would tie up a significant amount of funds (approximately $3,000 per filter) if the operator were to maintain an inventory of spare filters for his aircraft engine. In addition, this type of aircraft is used in extremely dirty environments. Huge quantities of flying insects take flight into the path of the aircraft which is flying low over crops to dust or spray insecticides. The inertial separator filter systems generally are only 87% to 92% efficient and, therefore, may allow significant contamination of the inlet airflow to the gas turbine engine. Also, the inertial separators are generally used in association with ram recovery scoops which obstruct the aerodynamic contour of the aircraft to provide a higher pressure inlet airflow to improve performance. This creates additional filter problems in that it facilitates entry of insects and other contaminants into the inlet airflow.

This invention allows the operator to use readily available automotive barrier filters which are significantly less expensive than the inertial separator systems. These filters are more readily available and an inventory of spares can be maintained with a minimum of investment. The filter system of this invention is almost 99.5% efficient and, therefore, results in a much less contaminated inlet airflow for the gas turbine engine.

SUMMARY OF THE INVENTION

The filter element of this system consists of a cylindrical can type perforated frame being closed by a solid bulkhead at one end. A perforated annular compartment is formed within the frame to accommodate a suitable filter material. An axially extending duct within the frame collects the radially flowing air after it passes through the filter material and directs it axially to an open outlet at one end of the frame. A sealing flange is attached to the filter by means of an axially extending bolt which extends through the solid bulkhead where it is secured. A duct is secured to the sealing flange to receive the air from the filter outlet and direct it to the compressor of the gas turbine engine. A manually operated bypass door is constructed in the inlet system to provide a secondary source of inlet airflow in the event that the filter system becomes clogged. This bypass door may be operated automatically through the use of appropriate pressure sensors and is designed to provide inertial separation of the incoming airflow. The filter system is mounted in the upper section of the nose portion of the aircraft body and receives air from a flat aerodynamically clean opening in this section. The filter system is mounted on a firewall which extends longitudinally in the aircraft nose portion and is constructed to isolate the filter system from the heated sections of the gas turbine engine.

DESCRIPTION OF THE PREFERRED EMBODIMENT

Figure 1:
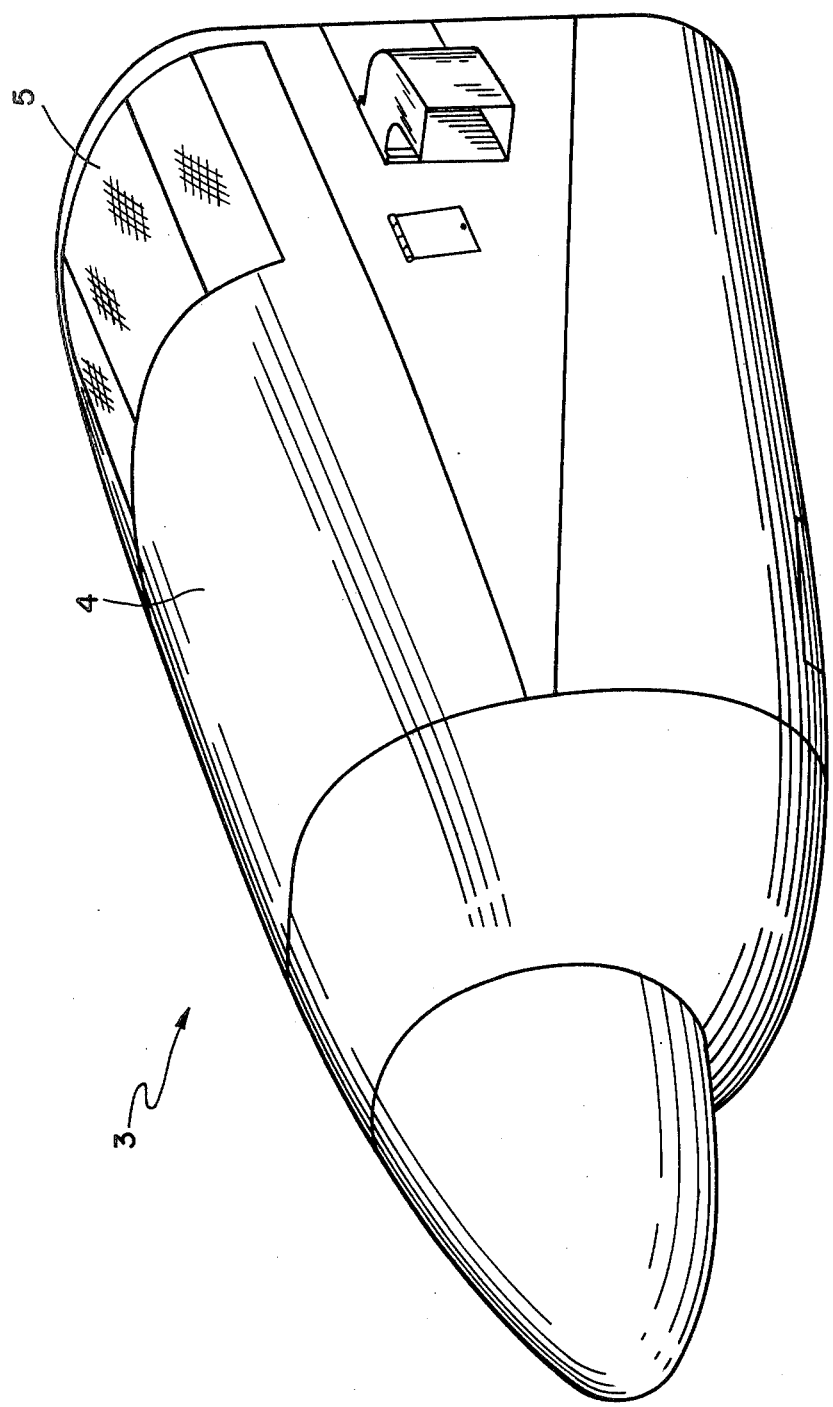
FIG. 1 is a perspective view of a housing for a gas turbine engine in which the filter system of this invention is contained.
Figure 2:
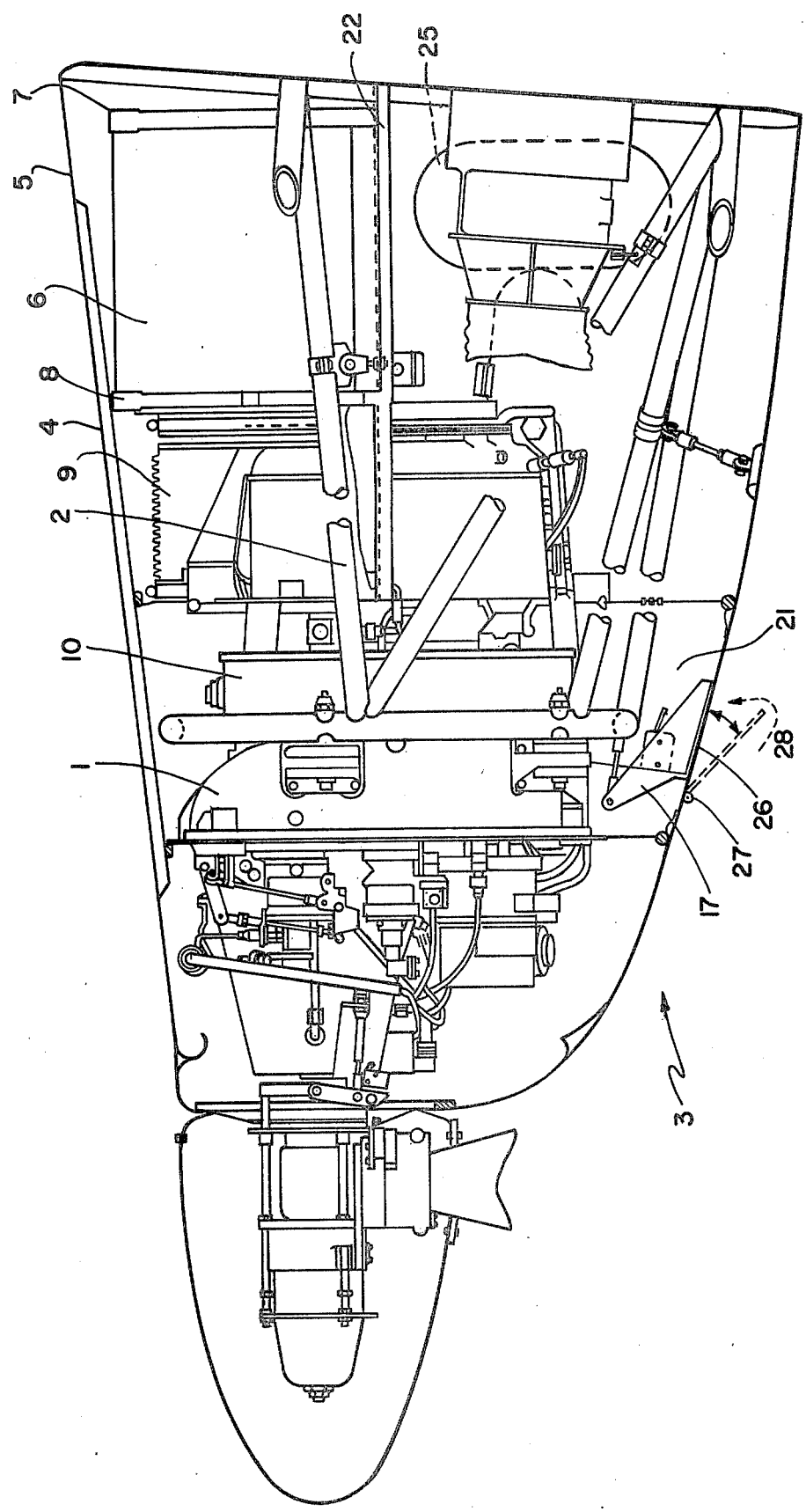
FIG. 2 is a side view of the engine compartment with the housing removed.
Figure 3:
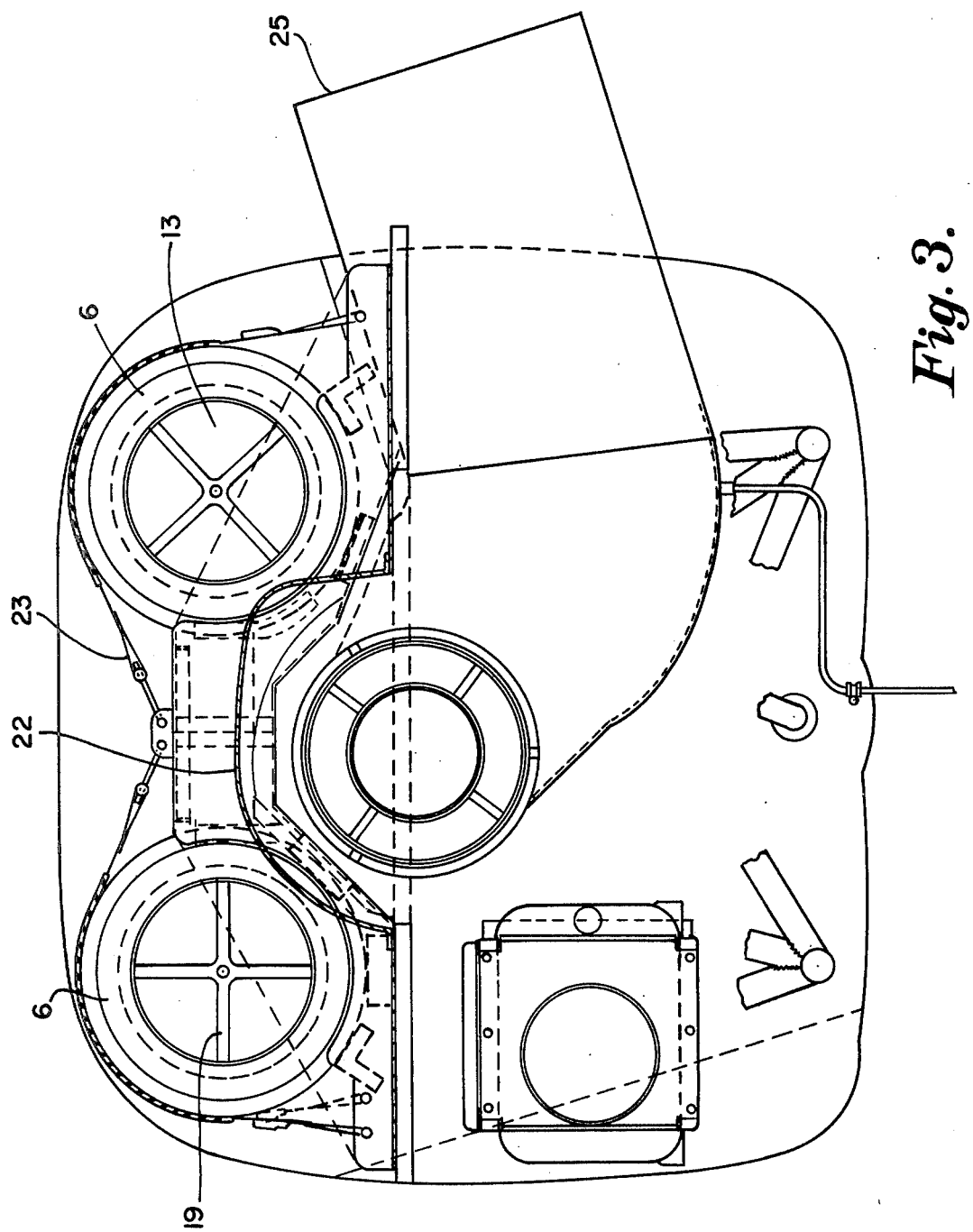
FIG. 3 is a cross sectional view of the filter housing.
Figure 4:
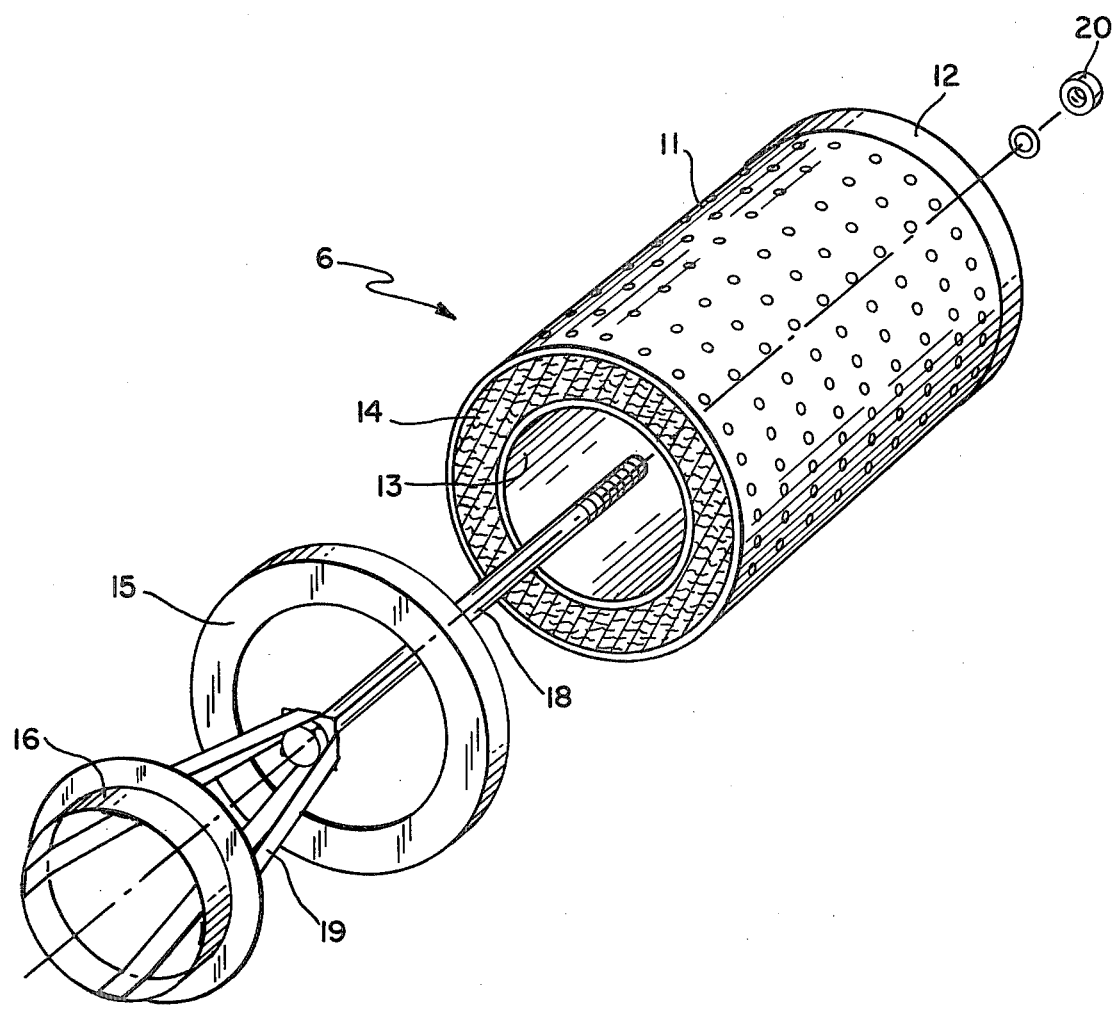
FIG. 4 is an exploded perspective view of the filter assembly of this invention.

As shown best in FIG. 2, a gas turbine engine 1 is mounted within the frame 2 of the nose portion 3 of an aircraft and is enclosed in an aerodynamically contoured housing 4. Air for the engine is drawn through flat inlet 5 on the top of housing 4 and is exhausted through duct 25.

Cylindrical filter assemblies 6 are installed in inlet 5 on mounting brackets 7 and 8 and may be held in place by steel tension straps 23. The filters 6 may be of the standard automotive type cylindrical barrier filter and are oriented in the inlet duct 5 with the axis transverse to the direction of incoming airflow. The air must therefore flow radially through the filter 6. The outlet duct 13 of filter 6 communicates with connecting duct 9 which directs the filtered air to the engine inlet 10.

The filter assembly 6 consists of an outer cylinder 11 which is perforated to allow the radial entry of air and is closed at one end by an imperforate cover plate 12. A central outlet passage 13 is constructed concentric with the cylinder 11. An annular filter element 14 is inserted around the outlet passage 13 within cylinder 11 to screen out contaminants in the inlet air stream. A closure 15 is mounted on the open end of cylinder 11 to contain the filter element and provide a flange 16 into which the connecting duct 9 may be attached. The flange 16 engages the outlet 13 of the filter assembly 6 to form a sealed connection with duct 9. The assembly 6 is held together by a bolt 18 which extends through a bracket 19 fixed to flange 16 and axially through outlet passage 13 and cover plate 12 where it is secured by a nut 20.

A bypass duct 21 is constructed in the inlet system to provide an auxiliary passage for emergency airflow to the engine in the event that the filter element 14 becomes clogged. Bypass duct 21 is controlled by entrance door 26 which is pivoted on hinge 27 to open duct 21 and allow air to flow to engine inlet 10. The door 26 is constructed to deflect the incoming air as shown by arrow 28 and force the air to flow in an angle around the edge of the door in order to create separation of the airflow so that particles of higher inertia are kept out of the inlet 10. Door 26 may be actuated through appropriate mechanical linkages 17 either manually or automatically by sensing the presence in engine inlet 10.

An insulating bulkhead 22 is constructed between the filter assemblies 6 and the hot engine parts to prevent heating of the incoming air.

In operation the air is sucked in through inlet 5 which is intentionally constructed to avoid obstruction of the airflow over the aerodynamic contours of housing 4. This prevents ramming of contaminants into the inlet airflow and avoids ingestion of larger particles which might clog the filter 6. The location of the inlet on the top side of the aircraft tends to avoid the dense region of contamination rising from below. A substantial portion of contaminants are caught in the filter element 14 as the air flows radially into the central passage 13 from which it is directed to inlet 10 of engine 1.

The brackets 7 and 8 and closure 15 are constructed so that the filter assemblies 6 can easily be removed and replaced. Since a relatively common automotive filter is employed, this invention allows an inexpensive and easy way to provide a highly effective, easily maintained filter system.

Having thus described the invention, what is claimed as novel and desired to be secured by Letters Patent of the United States is:

1. Apparatus for filtering the inlet airflow of a gas turbine engine said engine being mounted in the aerodynamically shaped nose portion of an agricultural aircraft comprising:
   a housing constructed in the nose portion and formed to enclose and support the gas turbine engine;
   a duct constructed in the housing;
   a first inlet opening constructed in the upper portion of the nose portion and having a low aerodynamic impedance to air flowing over the nose portion said inlet connected to the duct to allow the flow of air thereto;
   a cylindrical automotive type barrier filter assembly mounted in the duct with its longitudinal axis transverse to the airflow, said airflow flowing through the filter in a radial manner; said filter assembly comprising:
   a perforated cylindrical member which is closed at one end to form a receptacle;
   a perforated shroud mounted within and spaced radially from the cylindrical member to form an annular space within the receptacle, said shroud having an axially extending inner passage formed concentric with the axis of the cylindrical member to collect the radially flowing filtered air;
   an annular barrier filter element removably secured within the annular space in the receptacle and constructed to allow the radial flow of air;
   a closure adapted to removably fit over the open end of the receptacle to retain the filter element, said closure having a concentric opening communicating with the inner passage;
   a connecting duct connected to the filter passage and communicating directly with the inlet of the engine to form a sealed passage from the filter to the gas turbine engine;
   a bulkhead mounted in the housing to substantially surround the filter assembly and thermally insulate said assembly from the gas turbine engine;
   a bypass duct connected to the inlet of the gas turbine engine and constructed to allow the flow of air directly to the engine; and
   a second inlet constructed in the nose portion and connected to the bypass duct, said second inlet having means to open said inlet and allow the flow of air into the bypass duct in the event that the filter becomes clogged.

* * * * *